US011176181B2

(12) United States Patent
Karanjkar et al.

(10) Patent No.: US 11,176,181 B2
(45) Date of Patent: *Nov. 16, 2021

(54) INFERRING GEOGRAPHIC LOCATIONS FOR ENTITIES APPEARING IN SEARCH QUERIES

(71) Applicant: Google LLC, Mountain View, CA (US)

(72) Inventors: Sushrut Suresh Karanjkar, Fremont, CA (US); Viswanath Subramanian, Bangalore (IN); Shashidhar Anil Thakur, Saratoga, CA (US)

(73) Assignee: Google LLC, Mountain View, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 16/594,813

(22) Filed: Oct. 7, 2019

(65) Prior Publication Data
US 2020/0034378 A1 Jan. 30, 2020

Related U.S. Application Data

(63) Continuation of application No. 15/056,608, filed on Feb. 29, 2016, now Pat. No. 10,437,861, which is a (Continued)

(51) Int. Cl.
*G06F 16/29* (2019.01)
*G06F 16/9537* (2019.01)
*G06F 16/2457* (2019.01)

(52) U.S. Cl.
CPC ........ *G06F 16/29* (2019.01); *G06F 16/24578* (2019.01); *G06F 16/9537* (2019.01)

(58) Field of Classification Search
CPC . G06F 16/29; G06F 16/9537; G06F 16/24578
(Continued)

(56) References Cited

U.S. PATENT DOCUMENTS 6,772,142 B1 * 8/2004 Kelling ................. G06F 16/29
707/724
7,647,314 B2 * 1/2010 Sun ....................... G06F 16/951
707/742

(Continued)

FOREIGN PATENT DOCUMENTS

WO WO 2007002800 1/2007
WO WO 2007087629 8/2007

*Primary Examiner* — Ashish Thomas
*Assistant Examiner* — Nargis Sultana
(74) *Attorney, Agent, or Firm* — Dority & Manning, P.A.

(57) ABSTRACT

A server system associates one or more locations with a query by identifying the query, selecting a set of documents responsive to the query, and assigning weights to respective documents in the set of documents based, at least in part, on historical data of user clicks selecting search result links in search results produced for historical queries substantially the same as the identified query. Websites hosting the selected documents are identified, and, for each website, location-specific information for one or more locations is retrieved, including a location-specific score that corresponds to the likelihood that the respective location corresponds to a respective website. For each respective location for which location-specific information was retrieved, aggregating the location-specific scores, as weighted by the document weights, to compute an aggregated likelihood that the respective location is associated with the query. A specific location is assigned to the query when predefined criteria are satisfied.

19 Claims, 11 Drawing Sheets

Related U.S. Application Data continuation of application No. 13/329,178, filed on Dec. 16, 2011, now abandoned.

(60) Provisional application No. 61/423,963, filed on Dec. 16, 2010.

(58) Field of Classification Search
USPC .......................................................... 707/724
See application file for complete search history.

(56) References Cited

U.S. PATENT DOCUMENTS

| | | | | |
|---|---|---|---|---|
| 7,698,331 | B2* | 4/2010 | Carson, Jr. | G06Q 30/02 |
| | | | | 707/728 |
| 7,783,644 | B1* | 8/2010 | Petrou | G06F 16/3331 |
| | | | | 707/748 |
| 7,895,072 | B1* | 2/2011 | Manzi | G06F 16/29 |
| | | | | 705/7.11 |
| 7,987,195 | B1* | 7/2011 | Li | G06F 16/9537 |
| | | | | 707/765 |
| 8,122,042 | B2* | 2/2012 | Pan | G06F 16/951 |
| | | | | 707/759 |
| 8,200,694 | B1* | 6/2012 | Diligenti | G06F 16/9537 |
| | | | | 707/769 |
| 8,352,455 | B2 | 1/2013 | Tareen et al. | |
| 8,560,561 | B2 | 10/2013 | Govani et al. | |
| 8,635,205 | B1* | 1/2014 | Kang | G06F 16/9537 |
| | | | | 707/711 |
| 8,694,374 | B1* | 4/2014 | Diligenti | G06Q 30/02 |
| | | | | 705/14.47 |
| 2005/0234953 | A1* | 10/2005 | Zhang | G06F 16/3346 |
| 2006/0271518 | A1* | 11/2006 | Wang | G06F 16/9537 |
| 2006/0271531 | A1* | 11/2006 | O'Clair | G06Q 30/0205 |
| 2007/0015119 | A1* | 1/2007 | Atenasio | G09B 29/106 |
| | | | | 434/130 |
| 2007/0112777 | A1* | 5/2007 | Field | G06F 16/9537 |
| 2007/0198495 | A1* | 8/2007 | Buron | G06F 16/9537 |
| 2007/0233808 | A1* | 10/2007 | Egnor | G06F 16/958 |
| | | | | 709/217 |
| 2007/0239680 | A1* | 10/2007 | Oztekin | G06F 16/9535 |
| 2008/0010262 | A1* | 1/2008 | Frank | G06F 16/38 |
| 2008/0090591 | A1* | 4/2008 | Miller | G08G 1/096741 |
| | | | | 455/456.3 |
| 2008/0134088 | A1* | 6/2008 | Tse | G06F 16/29 |
| | | | | 715/810 |
| 2008/0154888 | A1* | 6/2008 | Buron | G06F 16/29 |
| 2008/0172357 | A1* | 7/2008 | Rechis | G06F 16/9537 |
| 2008/0270366 | A1* | 10/2008 | Frank | G06F 16/29 |
| 2009/0019028 | A1* | 1/2009 | Norris | G06F 16/9537 |
| 2009/0030899 | A1* | 1/2009 | Tareen | G06F 16/219 |
| 2009/0077221 | A1* | 3/2009 | Eisenstadt | G06F 16/958 |
| | | | | 709/224 |
| 2009/0106103 | A1* | 4/2009 | Milana | G06Q 30/0242 |
| | | | | 705/14.41 |
| 2009/0292684 | A1* | 11/2009 | Aggarwal | G06F 16/9537 |
| 2010/0076968 | A1* | 3/2010 | Boyns | H04W 4/029 |
| | | | | 707/732 |
| 2010/0153552 | A1* | 6/2010 | Parekh | H04L 61/1511 |
| | | | | 709/225 |
| 2010/0161591 | A1* | 6/2010 | Jones | G06F 16/29 |
| | | | | 707/722 |
| 2010/0174703 | A1* | 7/2010 | Dandekar | G06F 16/9537 |
| | | | | 707/722 |
| 2010/0218112 | A1 | 8/2010 | Park et al. | |
| 2010/0264655 | A1 | 10/2010 | Rosson et al. | |
| 2010/0332499 | A1 | 12/2010 | Pan et al. | |
| 2011/0029398 | A1 | 2/2011 | Boudville | |
| 2011/0035375 | A1 | 2/2011 | Bekkerman | |
| 2011/0167077 | A1* | 7/2011 | Govani | G06F 16/9537 |
| | | | | 707/767 |
| 2011/0231347 | A1 | 9/2011 | Xu et al. | |
| 2011/0231390 | A1 | 9/2011 | Inagaki et al. | |
| 2011/0252064 | A1 | 10/2011 | Murugappan | |
| 2011/0264655 | A1 | 10/2011 | Xiao et al. | |
| 2011/0302155 | A1 | 12/2011 | Yan et al. | |
| 2012/0158712 | A1 | 6/2012 | Karanjkar et al. | |
| 2012/0166431 | A1 | 6/2012 | Brewington et al. | |
| 2013/0002463 | A1 | 9/2013 | Garg et al. | |

* cited by examiner

| Query | Explicit Locations | Implicit Locations |
|---|---|---|
| 402 → Golden Gate Bridge San Francisco California | San Francisco, California | United States |
| 404 → Golden Gate Bridge San Francisco | San Francisco | California, United States |
| 406 → Golden Gate Bridge | None | None |
| 408 → Golden Gate Bridge San Fernando | San Fernando | California, United States |
| 410 → Golden Gate Bridge Callifornya | None | None |

Figure 4A

| URL |
|---|
| 412 → www.some_website.com |
| 414 → www.some_website.com/california/index.html |
| 416 → www.some_website.com/new_york/statue_of_liberty/home.htm |

INFERRING GEOGRAPHIC LOCATIONS FOR ENTITIES APPEARING IN SEARCH QUERIES

RELATED APPLICATIONS

Priority Claim

This application is a continuation of U.S. application Ser. No. 15/056,608 having a filing date of Feb. 29, 2016, which is a continuation of U.S. application Ser. No. 13/329,179 having a filing date of Dec. 16, 2011, which claims priority to U.S. Provisional Application 61/423,963, filed Dec. 16, 2010, "Inferring Geographic Locations for Entities Appearing in Search Queries," Applicant claims priority to and the benefit of each of such applications and incorporate all such applications herein by reference in its entirety.

TECHNICAL FIELD

The disclosed embodiments relate generally to search engine systems, and more specifically to search engines that enhance search results by inferring information from previously submitted queries.

BACKGROUND

Some search queries submitted by users contain explicit references to physical locations. In these cases the search engine can easily provide information about that location, which may be in addition to the responsive search results. For example, in response to "eiffel tower paris france," the search engine could provide information about Paris in addition to the search results about the Eiffel Tower. However, the query "eiffel tower" does not specify a physical location.

One way to infer unspecified locations is to identify locations that are geographically near the user. In some instances, the geographic location of a user can be determined by the user's IP address. A major weakness in this approach is that it does not provide location information when a user is seeking information about a distant location (e.g., a user in Los Angeles seeking information about the Eiffel Tower).

Another way to infer unspecified or "missing" locations in a search query is to use a lookup table. When a lookup term in the table matches a term in a query, the corresponding location is presumed. A drawback to this methodology is that it does not provide a notion of the prominence of the search entities when there are multiple entities with the same or similar names. Another drawback is that the locations that may be inferred are limited to the locations associated with preselected entities in the lookup table.

SUMMARY OF DISCLOSED EMBODIMENTS

The above deficiencies and other problems associated with assigning a physical location to entities appearing in a query are overcome by using queries submitted previously and capitalizing on those previously issued queries that contain references to physical locations. Information from queries that explicitly or implicitly specify locations can help to identify locations for other queries that do not specify locations. The same principle can be applied to websites to infer a physical location for an entity associated with the website.

In accordance with some embodiments, a method of associating one or more locations with a website is performed by a server system, which includes one or more processors and memory storing one or more programs for execution by the one or more processors. The method includes identifying a website, and for each respective location of a plurality of locations referenced in queries with respective result sets that comprise search result links to documents hosted at the website, computing a location-specific score representing the likelihood that the respective location is associated with the website. The method further includes computing a site confidence value representing a likelihood that the website is associated with a physical location, determining a location associated with the website using the location-specific scores and the site confidence value, and storing information indicating that the determined location is associated with the website for subsequent use when processing respective search queries.

In some embodiments, a non-transitory computer storage medium stores one or more programs, to be executed by one or more processors of a computer system. The one or more programs include instructions, that when executed by the one or more processors of the computer system perform the aforementioned method of associating one or more locations with a website.

In accordance with some embodiments, a method of associating one or more locations with a query received from a client device or system is performed by a server system, which includes one or more processors and memory storing one or more programs for execution by the one or more processors. The method includes In accordance with some embodiments, a method of associating one or more locations with a query is performed by a server system, which includes one or more processors and memory storing one or more programs for execution by the one or more processors. The method includes identifying a query, selecting a set of documents responsive to the identified query, and assigning weights to respective documents in the set of documents based, at least in part, on historical data of user clicks selecting search result links in search results produced for historical queries substantially the same as the identified query. The method further includes identifying respective websites hosting the documents in the set of documents, and, for each website of a plurality of the identified websites, retrieving location-specific information for one or more locations, the retrieved information for a respective location comprising a location-specific score that corresponds to the likelihood that the respective location corresponds to a respective website of the identified websites. The method also includes, for each respective location for which location-specific information was retrieved, aggregating the location-specific scores, as weighted by the document weights, to compute an aggregated likelihood that the respective location is associated with the query; and assigning a specific location to the query when predefined criteria are satisfied, the predefined criteria comprising a requirement that the aggregated likelihood for the specific location exceeds a first predefined value.

In some embodiments, a non-transitory computer storage medium stores one or more programs, to be executed by one or more processors of a computer system. The one or more programs include instructions, that when executed by the one or more processors of the computer system perform the aforementioned method of associating one or more locations with a query.

Thus methods, systems and computer readable storage media are provided that infer a physical location for a website or a search query, using information from previously issued search queries. Search engines are then able to provide information related to the relevant physical location to the user, creating an enhanced, more efficient user interaction with the search engine.

BRIEF DESCRIPTION OF THE DRAWINGS

For a better understanding of the aforementioned embodiments as well as additional embodiments, reference should be made to the Description of Embodiments below, in conjunction with the following drawings in which like reference numerals refer to corresponding parts throughout the figures.

FIG. 4A illustrates explicit and implicit physical locations contained in queries according to some embodiments.

FIG. 4B illustrates various URL's that may be associated with websites according to some embodiments.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

Figure 1:
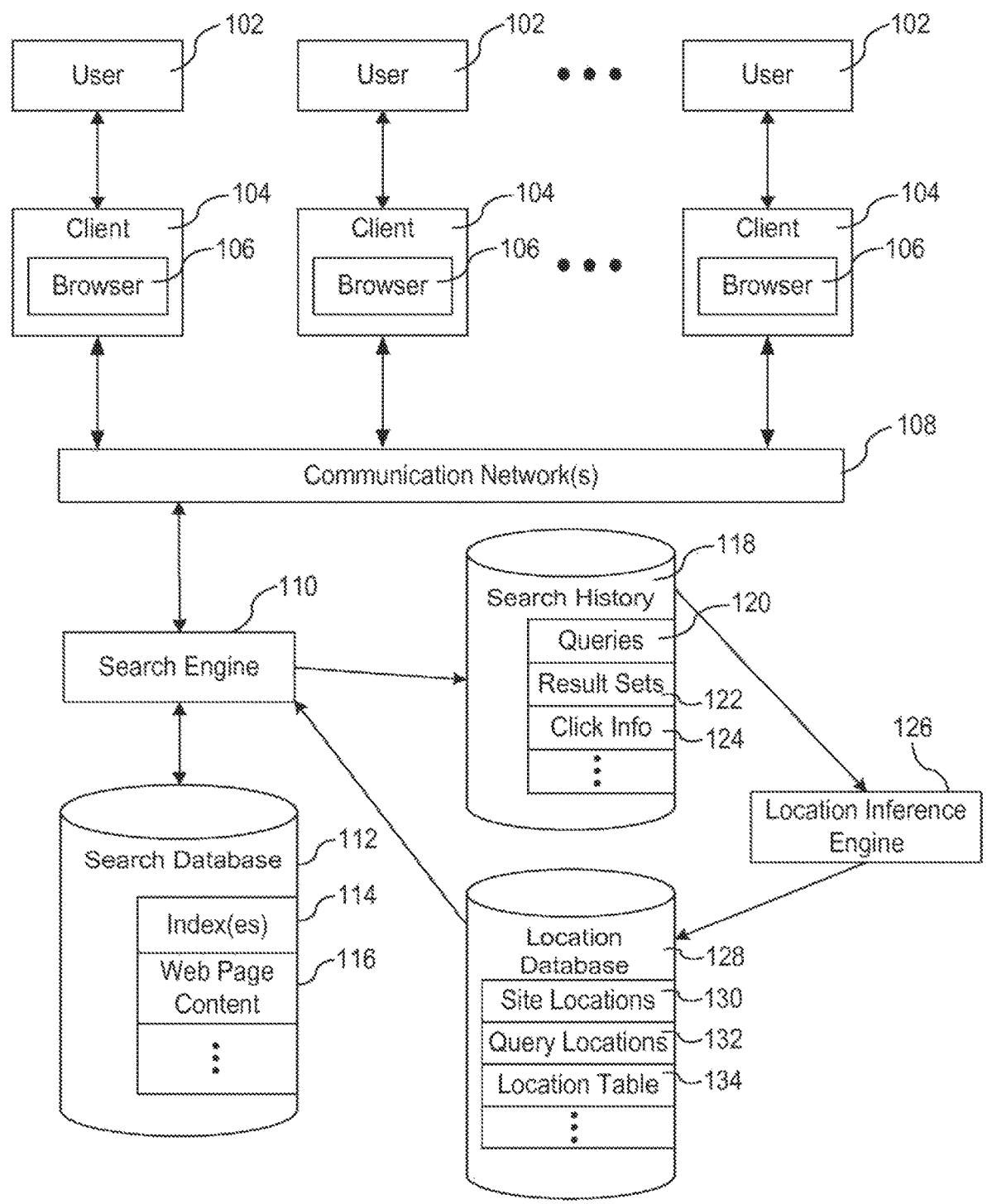
FIG. 1 is a conceptual illustration of the environment in which a location inference engine operates according to some embodiments.

FIG. 1 is a conceptual illustration of the environment in which some embodiments operate. A location inference engine 126 is an ancillary component for a search engine 110. The search engine 110 receives search queries from a plurality of users 102 using client devices or systems 104. In general, users 102 interact with a browser 106 or other client-resident application to transmit queries over a communication network 108 to the search engine 110. The communication network may include local area networks (LAN's), wide area networks (WAN's), the Internet, local intranets, metropolitan area networks, or any combination of these.

The search engine 110 utilizes one or more databases 112, which have one or more indexes 114 that index web page content 116 and are used to retrieve data responsive to user queries. In some embodiments, the database 112 contains cached copies of the web page content 116, which may be particularly useful when an indexed web page is no longer available at the original host. In additional to providing result sets responsive to user queries, the search engine saves information about the searches in a search history database 118.

In some embodiments, the search history database 118 includes the search queries 120 (e.g., the actual text of the queries). In some embodiments, the search history database includes, for a respective query, timestamps corresponding to when the queries were received or processed, and/or demographic information about the users 102 who submitted the query (e.g., location information corresponding to the IP addresses of the users, and/or demographic obtained from user profiles of the users). The search history database also includes the result set 122 (or a portion of the result set 122, such as the top N results, where N is an integer, such as 10, 20 or the like, typically having a value between 5 and 100) returned in response to each query 120. In some embodiments, the search history database 118 also includes click information 124, which identifies how many times each search result was selected by a user in response to a specific query. The term "click" as used herein refers to selection of a search result or corresponding link and is not limited to actual clicking with a mouse or other pointing device, but also includes other methods of selection (e.g., tapping on a touch sensitive pad or display or using a keyboard). In some embodiments, search history data is saved for each user query individually, even when the same query is issued by multiple users. In other embodiments, the search history data is aggregated (e.g., aggregated by query). For example, after the earthquake in Haiti in January 2010, millions of people searched for information using queries like "Haiti" or "Haiti earthquake." In embodiments that aggregate, there is a single entry for "Haiti earthquake" that includes the total number of times the query was issued, and the total number of clicks on each of the responsive search results. In some embodiments, aggregation is done over a period of time, such as a single hour, or a 24-hour period. In some embodiments, search queries are put in a standardized or canonical form to facilitate aggregation, and queries that share a common standardized or canonical form are aggregated. For example, "Haiti earthquake," "earthquake Haiti," and "earthquake in Haiti" might all be converted to the same canonical form. In addition, some embodiments use the canonical form to eliminate misspellings.

The location inference engine 126 uses the information in the search history database 118 to infer locations for websites and queries. The location inference engine stores its results in a location database 128. Some embodiments store information that identifies locations for websites (site locations 130). This information refers to geographic locations for one or more entities (e.g., objects or items) appearing in the web pages for the website. This information does not refer to the physical location of the servers running a website. For example, the location for a website devoted to the Eiffel Tower, as the term is used herein, would be Paris, France, regardless of where the website servers were located (which might be in the United States, for example). In some embodiments, the location database 128 stores information (query locations 132) to associate a geographic location with entities (e.g., query terms) appearing in a query. For example, query locations 132 would include the location Paris, France for the query "restaurants near Eiffel Tower." The location database 128 also includes a location table 134 that stores known locations, to be compared to search terms in submitted search queries to identify terms that reference locations.

Although search database 112, search history database 118, and location database 128 are illustrated as three distinct databases, some embodiments combine the data from two or more of these databases into a single database. For example, all three databases illustrated could be incorporated in a single database with distinct sets of tables corresponding to the functionality of the three illustrated databases.

Figure 2:
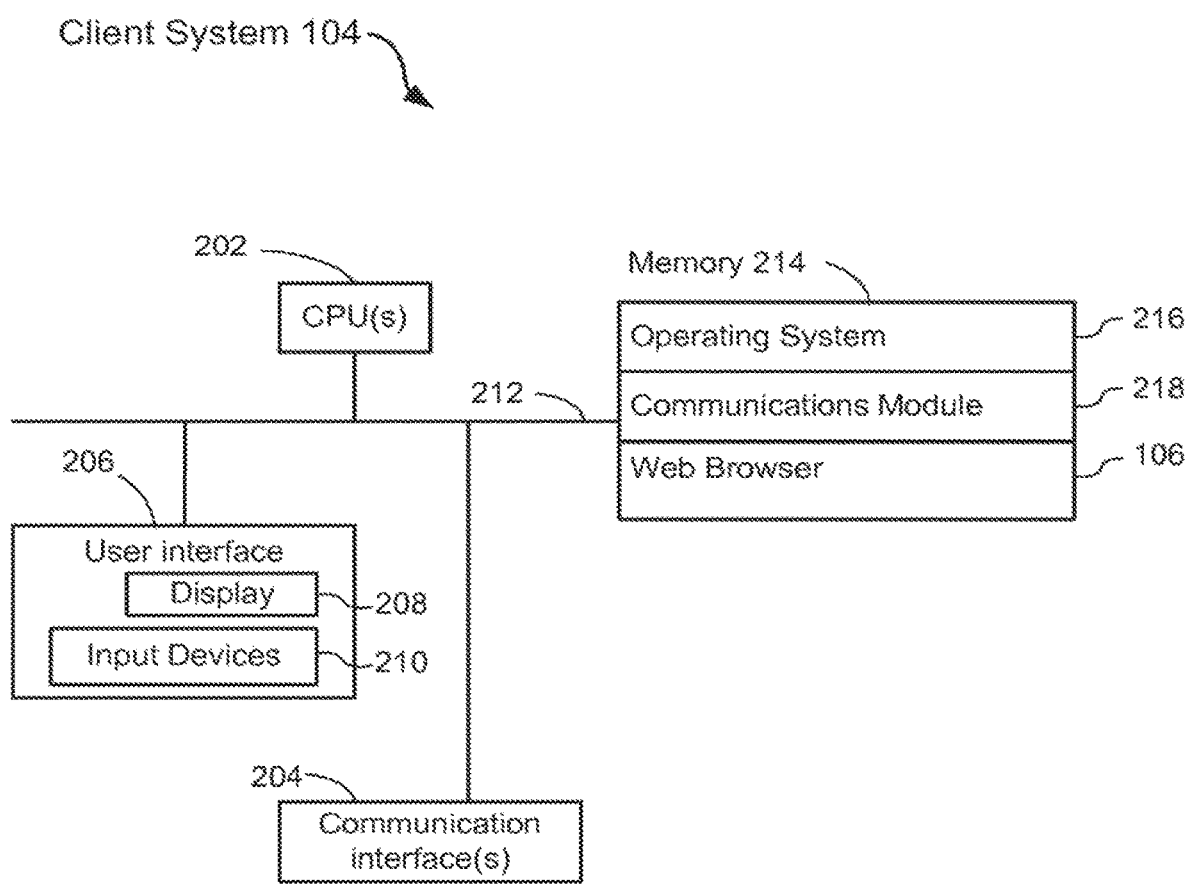
FIG. 2 is a block diagram of a client system according to some embodiments.

FIG. 2 is a block diagram of a client system 104 (sometimes herein called a client device or client computer system) according to some embodiments. Typical client system include, without limitation, desktop computers, laptop computers, smart phones, personal digital assistants, and tablet computers. A client system 104 typically includes one or more processing units (CPU's) 202 for executing modules, programs and/or instructions stored in memory 214 and thereby performing processing operations; one or more network or other communications interfaces 204; memory 214; and one or more communication buses 212 for interconnecting these components. The communication buses 212 optionally include circuitry (sometimes called a chipset) that interconnects and controls communications between system components. Client system 104 also includes a user interface 206. User interface 206 typically includes a display device 208 and one or more input devices 210; in some embodiments the display device 208 is a touch screen, in which case any separate input device is optional. In some embodiments, memory 214 includes high-speed random access memory, such as DRAM, SRAM, DDR RAM or other random access solid state memory devices. In some embodiments, memory 214 includes non-volatile memory, such as one or more magnetic disk storage devices, optical disk storage devices, flash memory devices, or other non-volatile solid state storage devices. In some embodiments, memory 214 includes one or more storage devices remotely located from the CPU(s) 202. Memory 214, or alternately the non-volatile memory device(s) within memory 214, comprises a non-transitory computer readable storage medium. In some embodiments, memory 214 or the computer readable storage medium of memory 214 stores the following programs, modules and data structures, or a subset thereof:

- an operating system 216 that includes procedures for handling various basic system services and for performing hardware dependent tasks;
- a communications module 218 that is used for connecting the client system 104 to other computers (e.g., the search engine 110 and its associated location inference engine 126, FIG. 1) via the one or more communication network interfaces 204 (wired or wireless) and one or more communication networks 108, such as the Internet, other wide area networks, local area networks, metropolitan area networks, and so on; and
- a web browser 106 or other client application that enables a user to request web pages from web servers, to submit search queries to the search engine 110, and to interact with web based applications.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 214 may store a subset of the modules and data structures identified above. Furthermore, memory 214 may store additional modules or data structures not described above.

Although FIG. 2 shows a client system 104 that allows a user to communicate with web servers, FIG. 2 is intended more as functional description of the various features which may be present in a set of one or more computers rather than as a structural schematic of the embodiments described herein.

Figure 3:
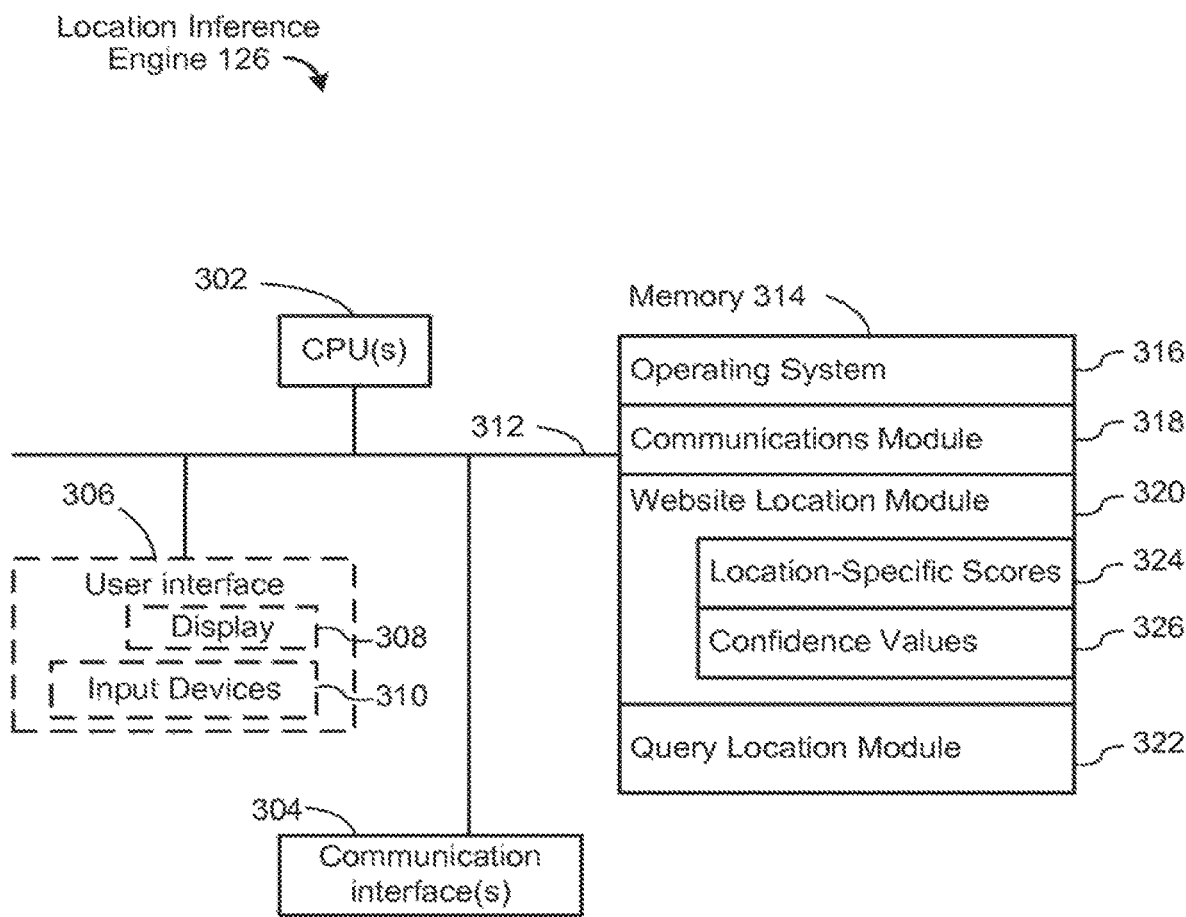
FIG. 3 is a block diagram of a location inference engine according to some embodiments.
Figure 7A:
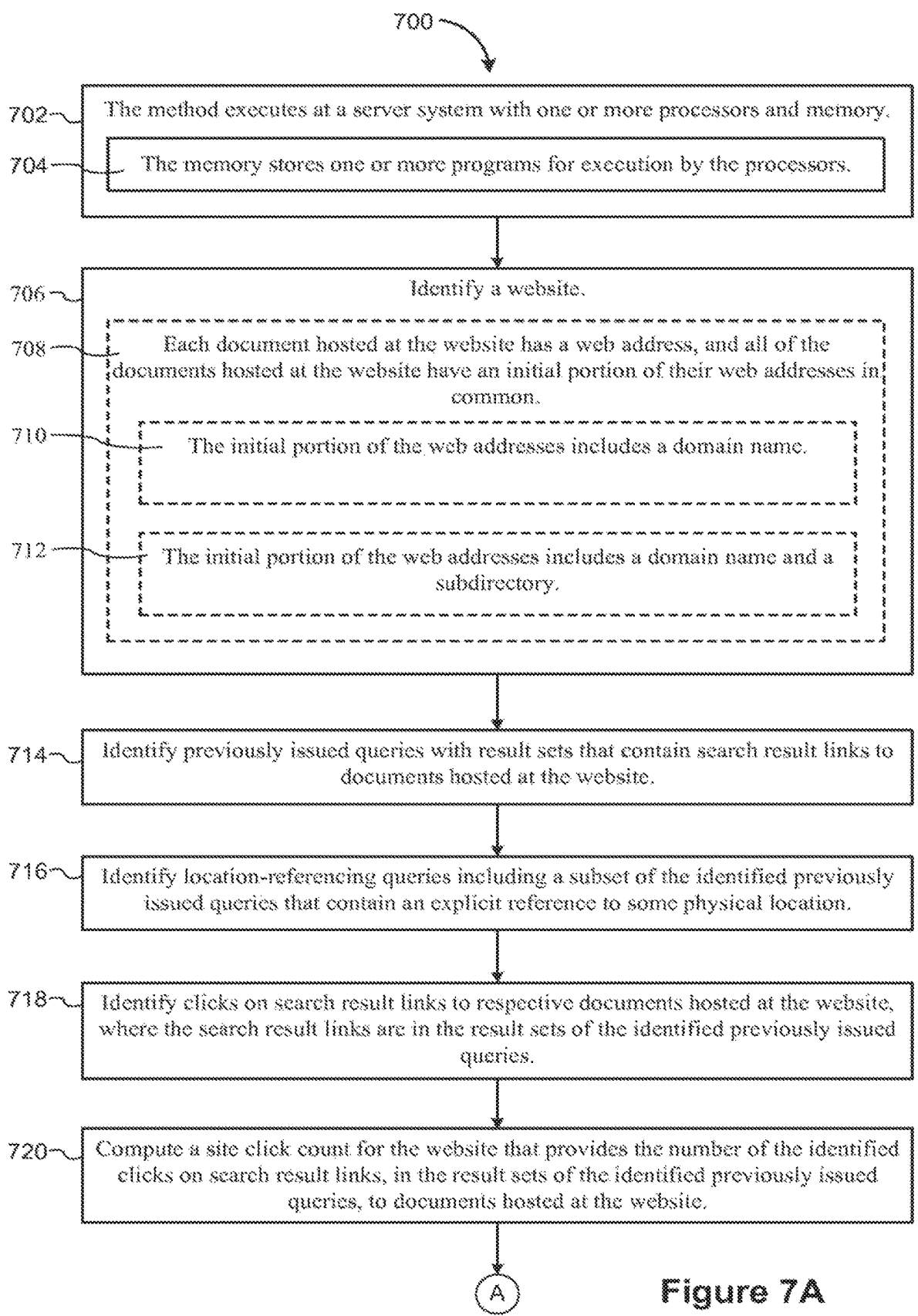
FIGS. 7A and 7B provide a flowchart of a process for inferring a location for a website using information in a query log according to some embodiments.
Figure 7B:
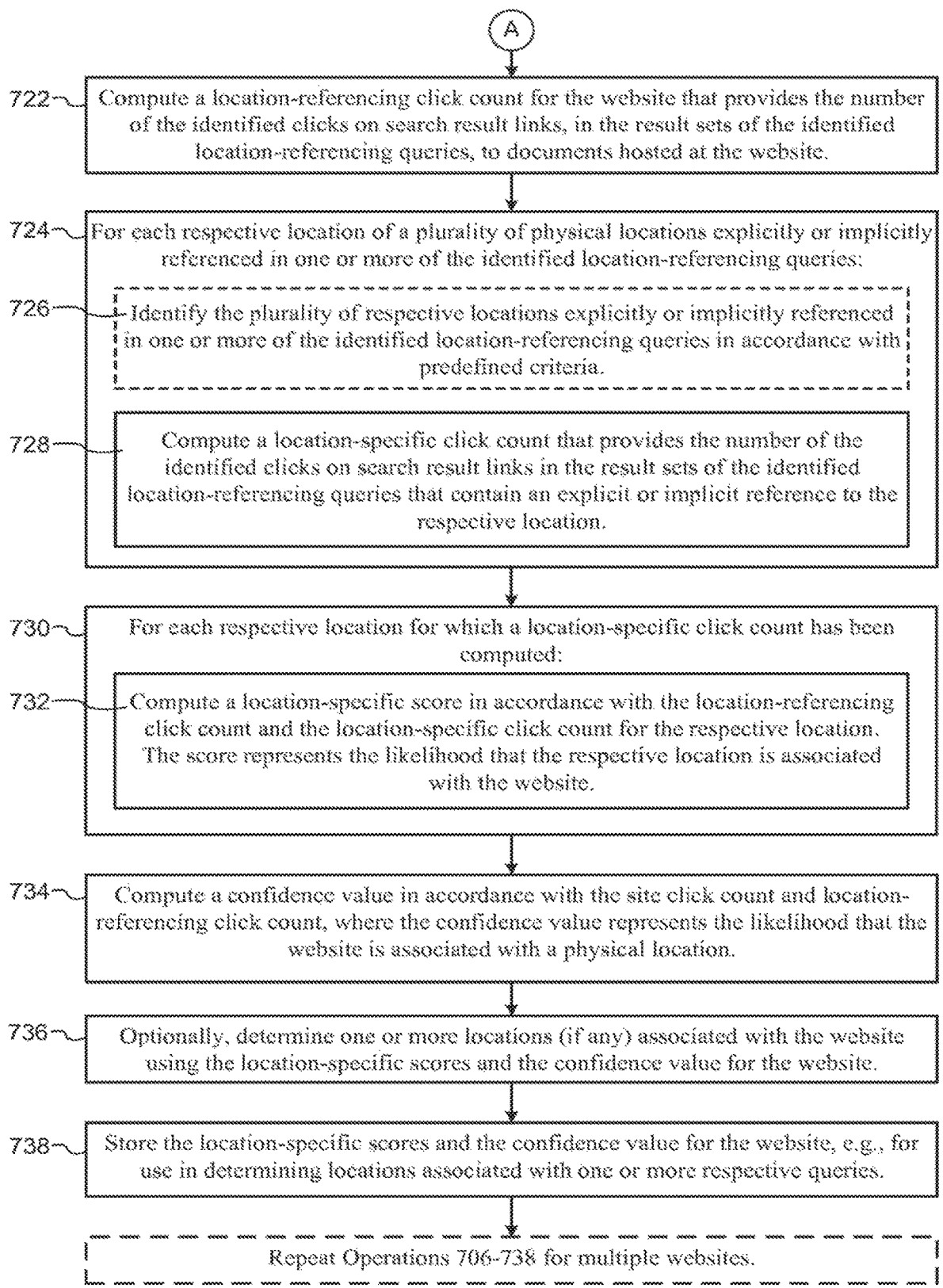
Figure 8A:
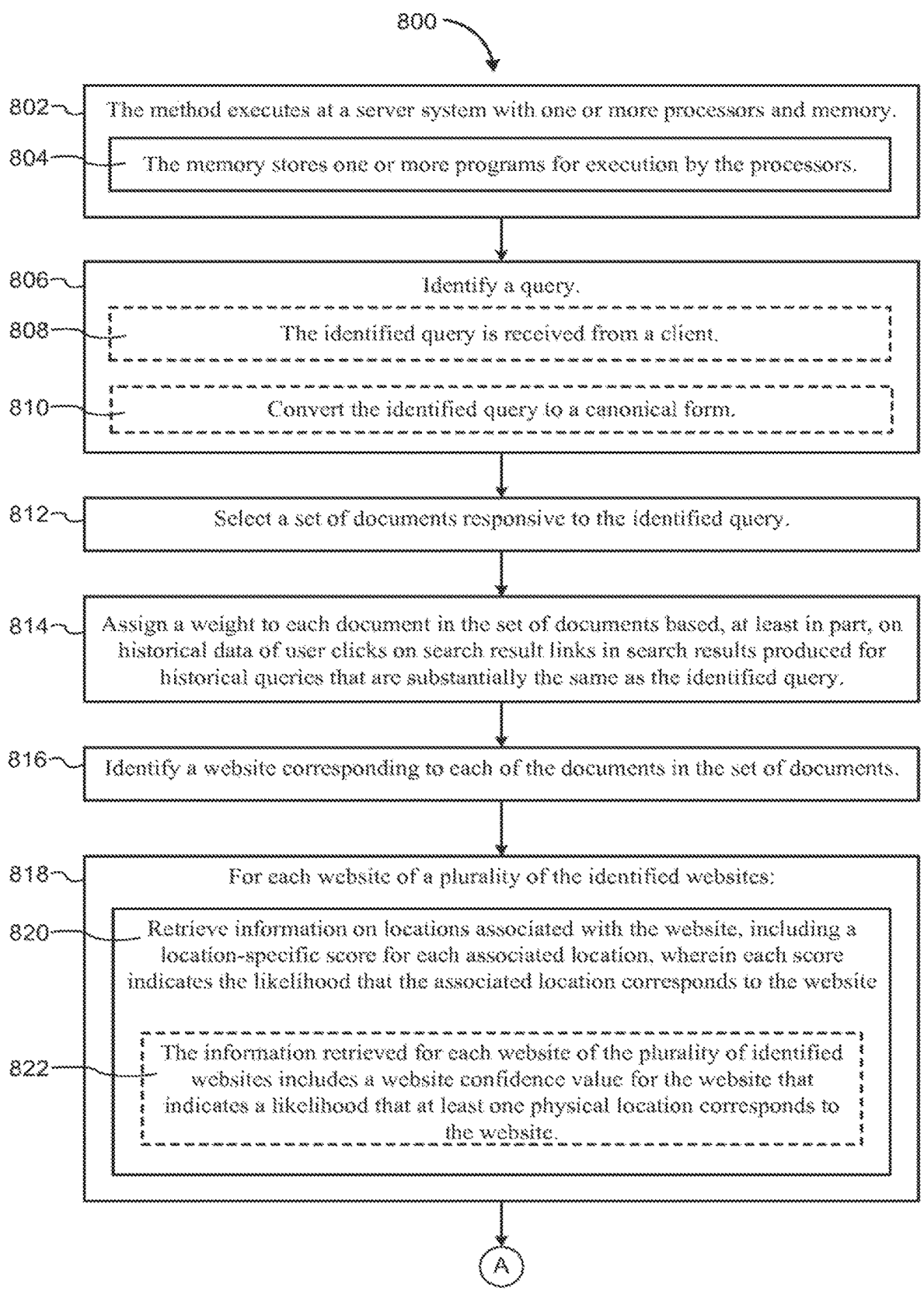
FIGS. 8A and 8B provide a flowchart of a process for inferring a location for a query using information in a query log according to some embodiments.
Figure 8B:
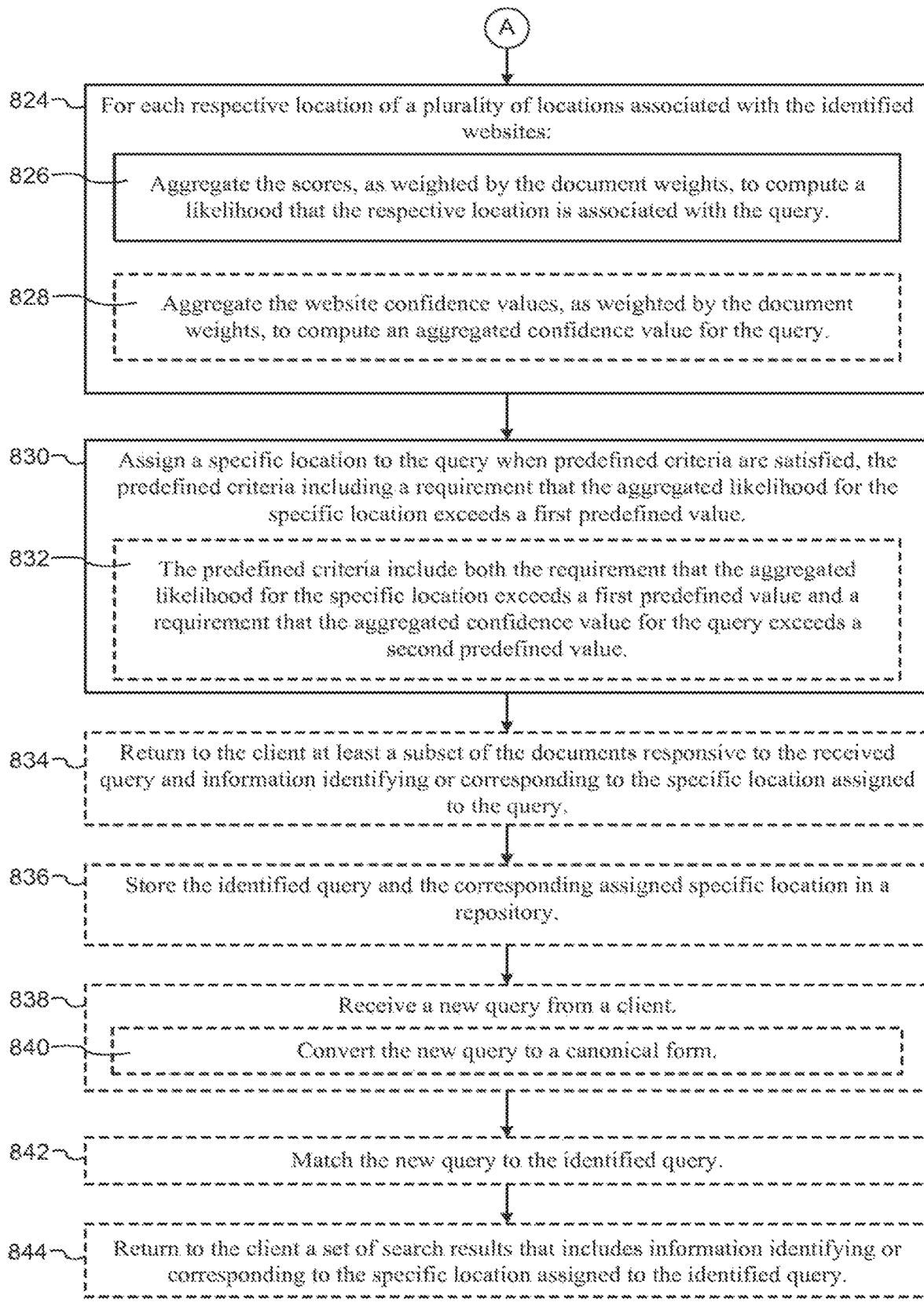

FIG. 3 is a block diagram illustrating a location inference engine 126 used to perform operations identified in FIGS. 7A, 7B, 8A, and 8B in accordance with some embodiments of the present invention. Location inference engine 126 typically includes one or more processing units (sometimes called processors, microprocessors or CPU's) 302 for executing modules, programs and/or instructions stored in memory 314 and thereby performing processing operations; one or more network or other communications interfaces 304; memory 314; and one or more communication buses 312 for interconnecting these components. Communication buses 312 optionally include circuitry (sometimes called a chipset) that interconnects and controls communications between system components. Location inference engine 126 optionally includes (but typically does not include) a user interface 306 comprising a display device 308 and/or one or more input devices 310. In some embodiments, memory 314 includes high-speed random access memory, such as DRAM, SRAM, DDR RAM or other random access solid state memory devices. In some embodiments, memory 314 includes non-volatile memory, such as one or more magnetic disk storage devices, optical disk storage devices, flash memory devices, or other non-volatile solid state storage devices. In some embodiments, memory 314 includes one or more storage devices remotely located from the CPU(s) 302. Memory 314, or alternately the non-volatile memory device(s) within memory 314, comprises a non-transitory computer readable storage medium. In some embodiments, memory 314 or the computer readable storage medium of memory 314 stores the following programs, modules and data structures, or a subset thereof:

- an operating system 316 that includes procedures for handling various basic system services and for performing hardware dependent tasks;
- a communications module 318 that is used for connecting the location inference engine 126 to other computers (e.g., search engine 110 and clients 102, FIG. 1) or databases (e.g., databases 112, 118, and 128, FIG. 1) via the one or more communication network interfaces 304 (wired or wireless) and one or more communications networks, such as the Internet, other wide area networks, local area networks, metropolitan area networks, and so on;
- a website location module 320 that infers geographic locations associated with websites based on previously submitted user search queries (see FIGS. 7A and 7B); and a query location module 322 that infers geographic locations for entities contained in search queries based on previously submitted queries (see FIGS. 8A and 8B).

In some embodiments, the website location module 320 stores location-specific scores 324 calculated using equation (4), below, and confidence values 326 calculated using equation (5), below. Alternatively, the location-specific scores 324 and confidence values 326 are stored in the location database 128 (FIG. 1) (e.g., in the site location information 130).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. The above identified modules or programs include instructions for performing all or a portion of the operations described with respect to FIGS. 7A, 7B, 8A, and 8B. In some embodiments, memory 314 may store a subset of the modules and data structures identified above. Furthermore, memory 314 may store additional modules or data structures not described above.

Although FIG. 3 shows a location inference engine 126 used to determine geographic locations associated with websites and entities contained within queries, FIG. 3 is intended more as functional description of the various features that may be present in a set of one or more computers rather than as a structural schematic of the embodiments described herein. In practice, and as recognized by those of ordinary skill in the art, items shown separately could be combined and some items could be separated. For example, some items shown separately in FIG. 3 could be implemented on individual computer systems and single items could be implemented by one or more computer systems. The actual number of computers used to implement a location inference engine 126, and how features are allocated among them will vary from one implementation to another, and may depend in part on the amount of search query history to process.

FIG. 4A illustrates both explicitly referenced locations and implicitly referenced locations for entities in search queries. In row 402, the query includes the entity "Golden Gate Bridge" as well as locations "San Francisco" and "California." Both "San Francisco" and "California" are explicit locations in the query, and suggest that the Golden Gate Bridge is in San Francisco, Calif. In addition to these explicit references, it is known that both San Francisco and California are part of the United States, so the United States is implicitly referenced in the query of row 402. Of course not all users will include "San Francisco" and "California" in a query about the Golden Gate Bridge. Some users will omit "California" as illustrated in row 404. In this case, "San Francisco" is still an explicit reference, but "California" is not. In general, both "California" and the "United States" are implicit references because San Francisco is in California. An explicit location thus implicitly references locations that include the explicit location. For example, an explicitly referenced state implicitly references a country, and an explicitly referenced city implicitly references a state and country. However, implicitly referenced locations cannot always be determined from an explicitly referenced location. For example, if a query contains only a city name, it is not always possible to determine the appropriate state. The city "Albany" may be in New York, but there are also cities named "Albany" in California, Georgia, Kentucky, Minnesota, Oregon, Texas, Wisconsin, and Western Australia. Similarly, row 406 in FIG. 4A, for the query "Golden Gate Bridge," there are no explicit locations and therefore no implicit locations either. It is noted that in other implementations, "Golden Gate Bridge" is considered to be an explicit location, and corresponding implicit locations are San Francisco, Calif. and the United States.

Row 408 illustrates a different issue. In this query a user has incorrectly identified the wrong city for the Golden Gate Bridge. In this particular example, the implicit state and country are California and the United States, which are correct, but an incorrect explicit location can lead to incorrect implicit locations as well. Row 410 illustrates a case where a user has misspelled the name of a location. In some cases the search engine 110 is able to correct misspellings, or suggest corrections to the user. If the misspelling "Califomya" is not corrected, it does not correspond to any known location, so there would be no explicit locations and no implicit locations. In some embodiments, the location inference engine 126 uses a very large quantity of data, and as a result, user errors such as those illustrated in rows 408 and 410 have no appreciable affect on the accuracy of the results.

FIG. 4B illustrates several URL's that may form the basis for a "website." As used herein, a website includes all of the documents whose URL's have the same initial path, which includes a domain name and optionally includes the name of one or more subdirectories. As noted above, the location(s) associated with a website are independent of where the website server is physically located. Therefore, the location (s) associated with a website are independent of whether the various documents for a single website are physically stored in one server or multiple servers, at one location or multiple locations. In FIG. 4B, URL 412 identifies a website, some_website_dot_com, which includes all documents whose URL's begin with the initial path "www_dot_some_website_dot_com", which includes the domain name of the website. As used herein, documents are "hosted" at a website when their URL's or network addresses are associated with the website as illustrated here, regardless of the physical locations where the documents are stored.

The URL's 414 and 416 are examples of URL's that specify more than just a domain name. If the website, some_website_dot_com, has subdirectories for both California (as illustrated by URL 414) and New York (as illustrated by URL 416), then the website, some_website_dot_com, probably could not be associated with a single state. Therefore, some embodiments selectively include one or more subdirectories as part of a defined website. For example, using URL 414, one could identify the website consisting of all documents whose URL's begin with www_dot_some_website_dot_com/california. If the web address of URL 414 is indicative of the contents of the corresponding website, then the website is associated with the state of California. In some embodiments, websites are identified with even narrower scope. For example, using URL 416, some embodiments would identify the set of documents whose URL's begin with www_dot_some_website_dot_com/new_york/statue_of_liberty as a website. One advantage of this narrow scope is that locations may be more precisely defined. For example, whereas the subdirectory/new_york might refer to places or entities throughout the state of New York, the subdirectory/new_york/statue_of_liberty is associated with the city of New York and the state of New York.

Therefore, as used herein, a website includes all documents whose web addresses or network addresses have a specified initial path, which includes a domain name and zero or more subdirectories.

Figure 5:
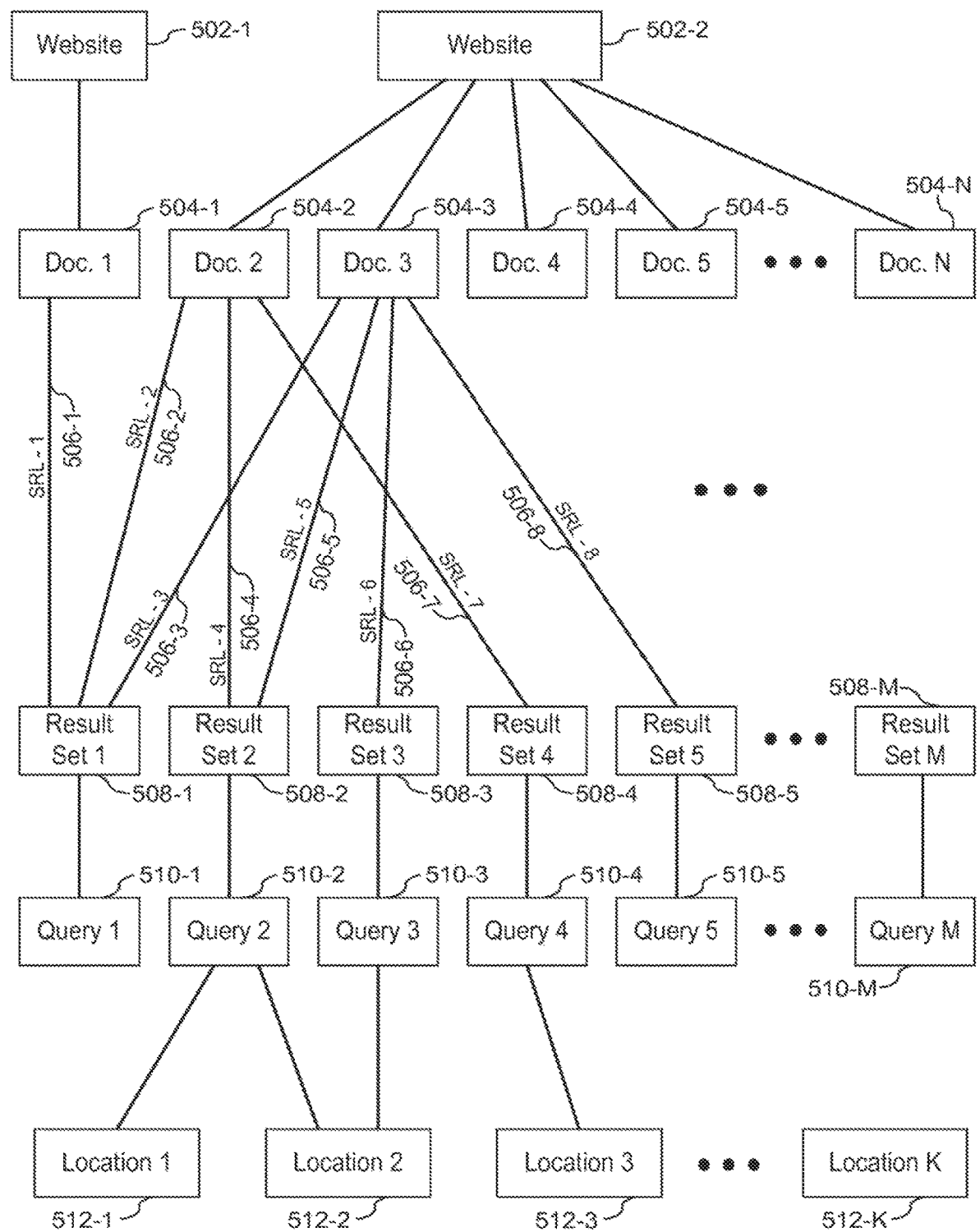
FIG. 5 illustrates graphically a relationship between locations and websites based on queries, result sets for the queries, and documents identified (e.g., by links to the documents) in the result sets according to some embodiments.

FIG. 5 schematically illustrates the interrelationship, in accordance with some embodiments, between:
- user queries 510;
- locations 512 explicitly or implicitly referenced in the queries 510;
- result sets 508 for the queries 510;
- individual search result links (SRL's) 506 in the result sets 508;
- documents 504 that the search result links 506 point to; and websites 502 that host the documents 504.

Locations are geographic or physical locations where entities may exist. As discussed earlier, the location of the Eiffel Tower is Paris, France, and the location of the Golden Gate Bridge is San Francisco, Calif. References to locations 512 may appear either explicitly or implicitly in user queries 510, as explained earlier with respect to FIG. 4A. In the embodiment of FIG. 5, locations 512-1, 512-2, and 512-3 are referenced by one or more search queries 510, but location 512-K is not referenced by any of the queries 510. There is a many-to-many relationship between queries 510 and locations 512 because each query 510 can specify zero or more locations 512 and each location 512 can correspond to zero or more queries 510. In this embodiment, queries 510-1 and 510-5 have no explicit or implicit location. Queries 510-3 and 510-4 each references exactly one location. Query 510-2 references two locations, namely 512-1 and 512-2. As shown in this embodiment, location 512-2 is referenced by both query 510-2 and query 510-3. In a more typical embodiment, a higher percentage of the queries specify no location (e.g., 90% might not specify a location). In addition, queries that do specify a location sometimes specify more than one location (either explicitly or implicitly), such as San Francisco and California, as illustrated in row 402 in FIG. 4A. Because locations can be cities, states, provinces, countries, or other geographic subdivisions within a country, having multiple locations specified is common.

Figure 9A:
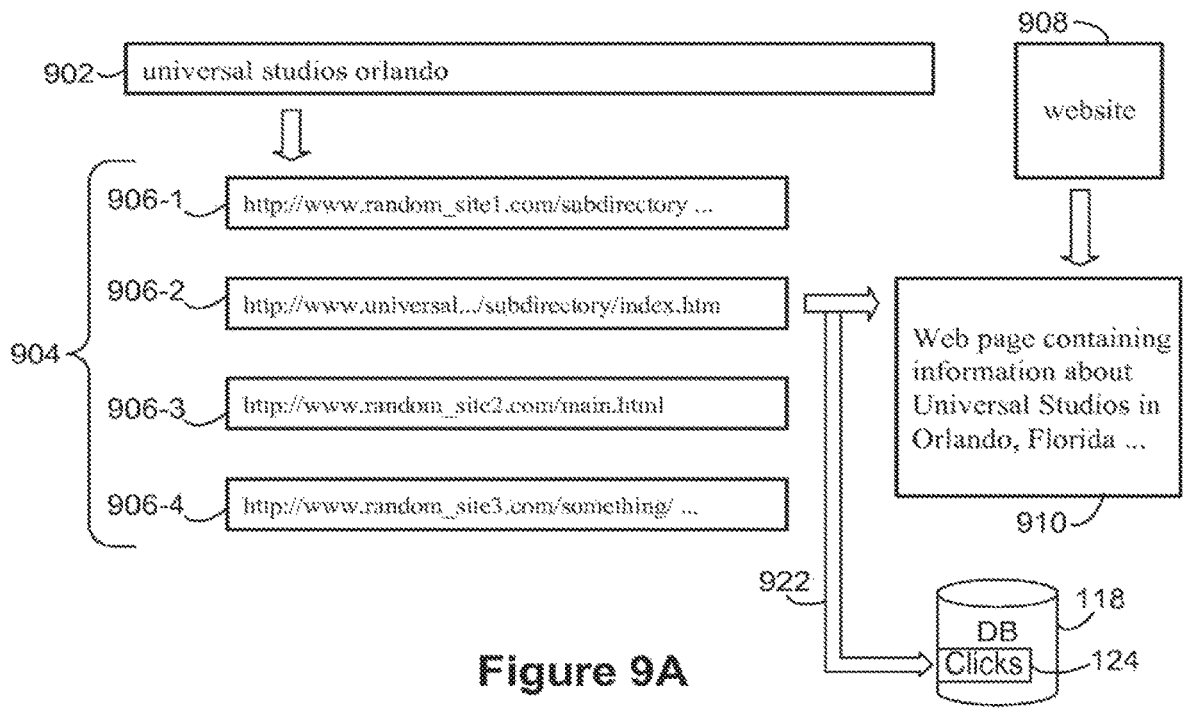
FIGS. 9A and 9B illustrate a process of counting clicks on search results according to some embodiments.
Figure 9B:
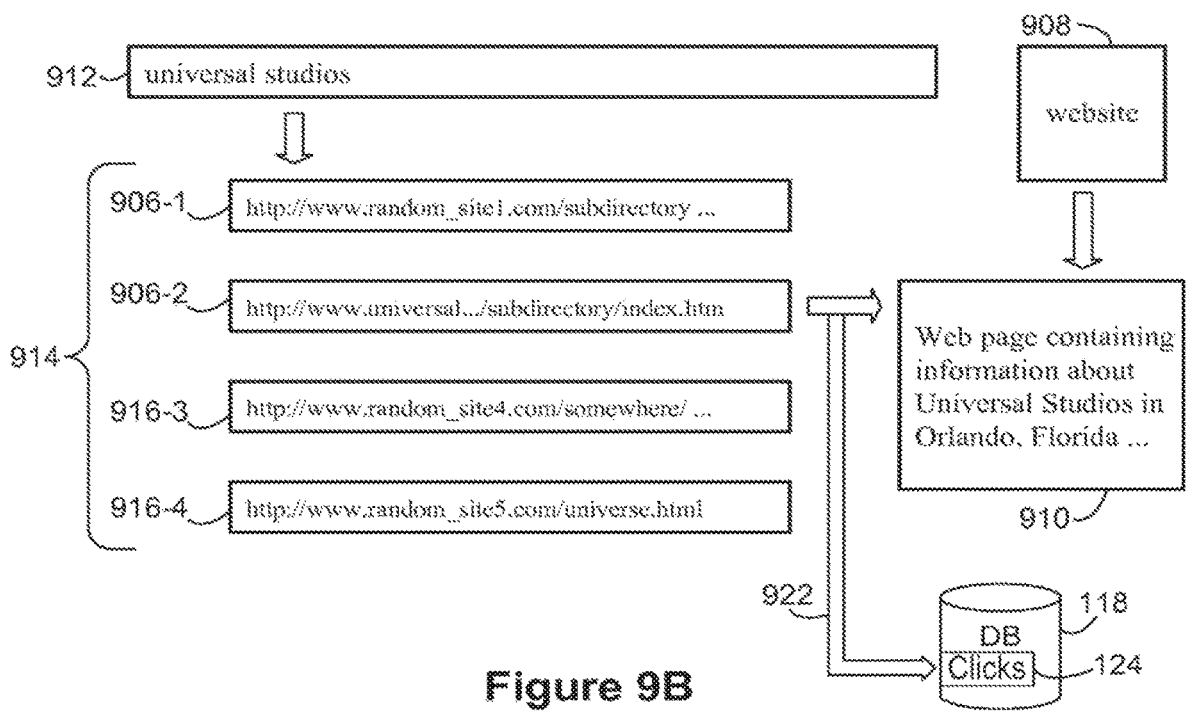

For each query 510 there is a corresponding result set 508. For example, query 510-1 has result set 508-1, query 510-2 has result set 508-2, etc. Although the result set 508 for a given query 510 may change over time, at any point in time a search engine 110 will generally return the same result set 508 for the same query 510. Each query 510 and corresponding result set 508 is stored in search history database 118 (FIG. 1). Each result set 508 includes a set of search result links 506 to documents 504, as discussed below and as illustrated in FIGS. 9A and 9B. Typically, a set of search results 508 has many search result links 506. For example, a typical set of search results 508 may include hundreds or thousands of individual search result links 506. FIG. 5 illustrates only a small number of search result links 506 due to typographic and space limitations. As noted above, in some embodiments the result set 508 stored in search history database 518 includes only a subset of the search results returned by a search engine, such as the top N results, where N is an integer (e.g., 10, 20 or the like, typically having a value between 5 and 100).

As illustrated in FIG. 5, a respective search result link 506 is a link to a document 504, which is hosted at a respective website 502. Result set 508-1 illustrates the common case of a result set that includes links to multiple distinct websites. In this illustration, result set 508-1 includes links 506-2 and 506-3 to documents 504-2 and 504-3, which are both hosted at website 502-2. In addition, result set 508-1 has a link 506-1 to document 504-1, which is hosted at a different website 502-1. Result set 508-2 similarly has links to documents 504-2 and 504-3 hosted at website 502-2, but has no link to document 504-1. FIG. 5 illustrates result sets 508-3, 508-4, and 508-5, each with a link to a document hosted at website 502. Not shown are the many links 506 to other documents hosted at other websites not shown in FIG. 5. The search result links 506 illustrate the many-to-many relationship between result sets 508 and documents 504. Also illustrated are documents 504-4 and 504-5, which have no links from the result sets 508. FIG. 5 thus illustrates how locations 512 are associated with websites 502 based on user queries 510 and the corresponding result sets 508. A process to determine locations 512 associated with a website 502 using this data is explained below with respect to FIGS. 7A and 7B.

Figure 6:
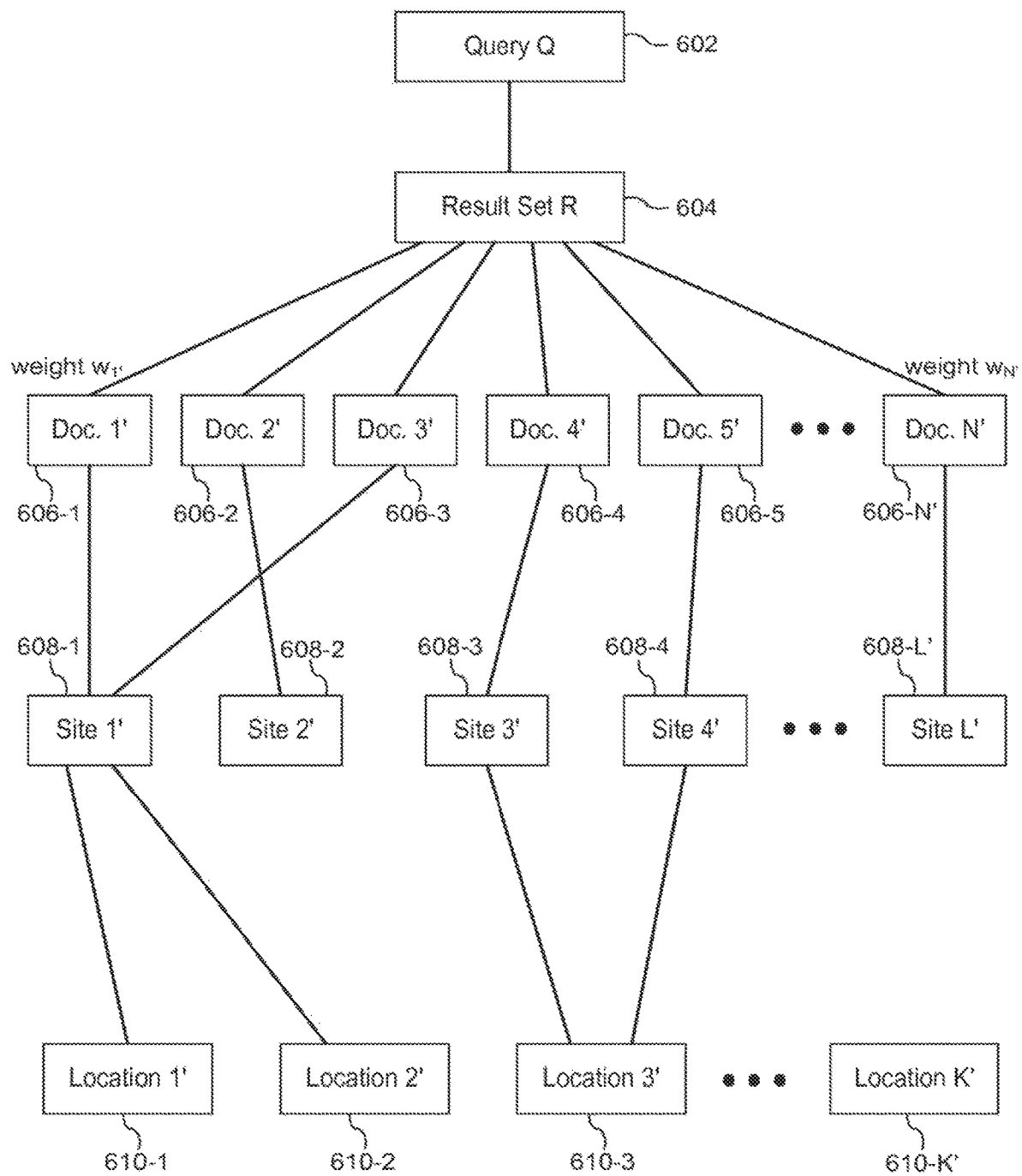
FIG. 6 illustrates graphically a relationship between locations and a query based on websites, documents from the websites, and a result set for the query according to some embodiments.

FIG. 6 is similar to FIG. 5, but illustrates the various interrelationships that are used to compute a location associated with an individual query rather than an individual website. A query 602 has an associated result set 604 that includes links to various documents. Based on historical data for the query 602 and queries that are substantially the same (e.g., that share a common standardized or canonical form), weights are assigned to respective documents 606 (e.g., to each of the documents 606). For example, in the embodiment of FIG. 6, document 606-1 has weight $w_{1'}$, and document 606-N' has weight $w_{N'}$. In some embodiments, the weights are normalized so that the sum of the weights of all the documents in the result set is 1. In some embodiments, the weights are assigned based on historical data of user clicks on links to the documents from result set 604. That is, each weight $w_{i'}$ represents (or corresponds to) the probability that a user will select a corresponding document i' in the result set.

In some embodiments, each document 606 of result set 604 is associated with a website 608. In some embodiments, websites are identified in such a way that each document 606 is hosted by and thus associated with a unique website 608. How websites are identified is addressed above with respect to FIG. 4B. As shown in the example in FIG. 6, two or more documents identified in a query's result set may be associated with (e.g., hosted by) the same website. For example, documents 606-1 and 606-3 are both hosted at website 608-1. Some of the websites are associated with one or more geographic locations, as illustrated by websites 608-1, 608-3 and 608-4. Some websites (e.g., website 608-1) are associated with two or more locations (e.g., locations 610-1 and 610-2). For instance, the website 608-1 includes a document or documents discussing or describing a first entity located at location 610-1 and a second entity located at location 610-2. In one example, a single website has information about Universal Studios in both Los Angeles, Calif. and Orlando, Fla., and thus is associated with both locations. In other instances, a website is associated with a single location, as illustrated by site 608-4 and location 610-3. For example, the entity or entities discussed or described in the document 606-5 hosted on the website 608-4 are only located at location 610-3. Typically, there will be some documents 606 hosted at websites 608 that are not associated with any geographic location. In FIG. 6, websites 608-2 and 608-L' are not associated with any locations. Also, in some cases multiple websites are associated with the same location. For example, websites 608-3 and 608-4 are both associated with the same location 610-3.

The location calculations corresponding to FIG. 6 are described below with respect to FIGS. 8A and 8B.

In the following discussion, certain equations are provided that concisely explain some of the details. In these equations, "q" or "Q" denotes a search query, "s" denotes a website, "d" denotes a document hosted at a website, and "l" denotes a reference to a physical or geographic location.

FIGS. 7A and 7B provide a flowchart of an exemplary process 700 performed by a website location module 320 (FIG. 3) in a location inference engine 126 (FIGS. 1 and 3) to associate one or more locations with a website. Method 700 executes (702) at a server system with one or more processors and memory. In some embodiments, the method 700 executes on a single server computer; in other embodiments, method 700 executes on a plurality of server computers. In some embodiments, the distribution of work across multiple server computers is based on partitioning the queries or websites into subsets for processing. The memory in each server computer stores (704) one or more programs that are executed by the processors of the server computer. The programs comprise executable instructions that, when executed, perform the operations of method 700.

Initially, method 700 identifies (706) a website s. Subsequent operations in the method 700 determine which, if any, geographic locations are associated with this identified website (e.g., geographic locations discussed or described in documents hosted on this website). A document d hosted at website s is denoted by d @ s. The website that hosts document d is denoted by site(d). As noted earlier, documents are "hosted" at a website when their URL's or network addresses are associated with the website, regardless of the physical locations where the documents are stored. In some embodiments, each document hosted at the website has a web address, and all of the documents hosted at the website have an initial portion (sometimes called an initial path) of their web addresses (e.g. URL's) in common (708), as illustrated above with respect to FIG. 4B. In some embodiments, the initial portion shared by the documents at the website includes (710) a domain name, as illustrated by row 412 in FIG. 4B. In other embodiments, the initial portion of the web addresses that are shared by the documents at the website includes (712) a domain name and one or more subdirectories, as illustrated by rows 414 and 416 in FIG. 4B.

Method 700 also identifies (714) previously issued queries with result sets that contain search result links to documents hosted at the website. For brevity, the expression rs(q) denotes the result set generated in response to query q, and wrq denotes the set of website referencing queries, which are the queries (identified by operation 714) with results sets that contain search result links to documents hosted at the identified website s. A result set includes links to documents, although colloquially a result set is said to "contain" documents. The expression d∈rs(q) indicates that the result set for query q includes a search result link to document d. Of the previously issued queries identified in operation 714, method 700 identifies (716) a subset of those queries that are location-referencing queries. A location-referencing query is (716) a previously issued query that contains an explicit reference to some physical location. The abbreviation lrq denotes the subset comprising location-referencing queries.

Method 700 identifies (718) clicks on search result links to documents hosted at the website, where the search result links are in the result sets of the previously issued queries identified in operation 714. These clicks are referred to as document clicks and also as user clicks, because they correspond to selections of search result links by users. In some embodiments, the clicks are identified within the click information 124 in the search history database 118 (FIG. 1). User clicks provide useful information because they indicate that users have selected specific documents from the set of generated results. In particular, a user click on a search result link suggests that the associated document is relevant to the user's search query. Numerous user clicks on a search result link, in search results for the previously issued queries identified in operation 714, are even more suggestive that the associated document is relevant to the search queries of those users.

Method 700 computes (720) a site click count for the website, which is the number of the identified document clicks on search result links, in the result sets of the identified previously issued queries (see 714), to documents hosted at the website. The expression click(d, q) denotes the number of clicks on a search result link to document d, when the search result link was part of a result set for query q. A concise expression for the site click count is given by:

$$\text{site\_clicks}(s) = \sum_{q \in wrq} \sum_{\substack{d@s \\ d \in rs(q)}} \text{click}(d, q) \quad (1)$$

Method 700 computes (722, FIG. 7B) a location-referencing click count for the website, which provides the number of document clicks on search result links, in the result sets of the identified location-referencing queries (see 716), to documents hosted at the website. The location-referencing click count is like the site click count, but limited to queries that explicitly reference a location. A concise expression for the location-referencing click count is given by:

$$\text{location\_referencing\_clicks}(s) = \sum_{q \in lrq} \sum_{\substack{d@s \\ d \in rs(q)}} \text{click}(d, q) \quad (2)$$

As seen in the formulas for site clicks and location-referencing clicks, each of these numbers is computed one time for the website. These click counts do not correspond to any specific geographic location. Method 700 also computes click counts for each specific location: for each respective location that is explicitly or implicitly referenced in one or more of the identified location-referencing queries (724), method 700 computes (728) a location-specific click count. Each location-specific click count provides (728) the number of the identified document clicks on search result links in the result sets of the identified location referencing queries that contain an explicit or implicit reference to the respective location. The discussion above with respect to FIG. 4A explains the use of explicit and implicit location references. A concise expression for the location-specific click counts is given by:

$$\text{location\_specific\_clicks}(s, l) = \sum_{\substack{q \in lrq \\ l \in q}} \sum_{\substack{d@s \\ d \in rs(q)}} \text{click}(d, q) \quad (3)$$

Location-specific clicks are a function of both the website s and the location l. In the above expression, the simple expression l∈q indicates that location l is explicitly or implicitly referenced in query q.

In some embodiments, method 700 identifies (726) the locations explicitly or implicitly referenced in one or more of the identified location-referencing queries in accordance with predefined criteria. In some embodiments, the predefined criteria identify explicit location references using a table lookup (e.g., using the location table 134, FIG. 1). One elementary lookup method compares each term of the search query to a known list of locations (e.g., cities, states, provinces, and countries); if the term matches an item in the list, the term is presumed to be a location and the query is presumed to be a location-referencing query. In preferred embodiments, more advanced matching techniques are used so that multi-part names (e.g., "San Francisco," "Port au Prince," etc.) are identified. In some embodiments, additional tables are used to associate locations with each other. Thus, when one location is identified, other associated locations are identified automatically (implicitly). Implicit identification of locations is illustrated by rows 402, 404, and 408 in FIG. 4A.

For each respective location for which a location-specific click count has been computed (730), method 700 computes (732) a location-specific score for the website. The location-specific scores are computed (732) in accordance with the site click count, the location-referencing click count and the location-specific click count for the respective location. The score represents (or, more generally, corresponds to) the likelihood that the respective location is associated with the website. In some embodiments, the location-specific score, lss(s,l), for location l and site s is computed as:

$$lss(s, l) = \text{location\_specific\_score}(s, l) = \frac{\text{location\_specific\_clicks}(s, l)}{\text{location\_referencing\_clicks}(s)}. \quad (4)$$

In some embodiments, method 700 computes (734) a site confidence value in accordance with the site click count and the location-referencing click count. The site confidence value (for a respective website s) represents the likelihood that the website s is associated with one or more physical locations, as indicated by the degree to which user clicks indicate that the website is associated with one or more physical locations. In some embodiments, the site confidence value, site_conf(s), is computed as:

$$\text{site\_conf}(s) = \frac{\text{location\_referencing\_clicks}(s)}{\text{site\_clicks}(s)}. \quad (5)$$

In some embodiments, the location specific scores and the site confidence are stored (738), for use when determining locations associated with a respective query, or set of queries, as described below with reference to FIG. 8A, 8B. Moreover, operations 706-738 are repeated for multiple websites, and the location specific scores and the site confidence are stored for multiple websites.

Optionally, method 700 determines (736) zero or more locations (e.g., one or more locations, or two or more locations) associated with the website s, using the location-specific scores and the site confidence score for website s. In some embodiments, the location-specific score, lss(s,l) for at least one of the plurality of respective locations l is mathematically combined with (e.g., multiplied by) the site confidence score to produce a location-specific confidence score, ls_conf(s,l) for location l with respect to website s, and then that location-specific confidence score is compared with a predefined confidence threshold value. In some embodiments, the location-specific confidence score, ls_conf(s,l) is equal to $$\frac{\text{location\_specific\_clicks}(s, l)}{\text{site\_clicks}(s)}.$$

When a location has a location-specific confidence score above the confidence threshold value, that location is identified as being associated with the website s.

Optionally, the number of locations identified as being associated with a website s is limited to a predefined number, L (e.g., an integer between 1 and 10, such as 1, 2, 3, 4, 5 or 10). When the number of locations having confidence score above the threshold is greater than the limit L, the locations have the L highest confidence scores are selected and identified as the locations associated with the website s.

Optionally, the location-specific scores for the plurality of respective locations are processed in an order determined by their values, starting with the location-specific score having the largest value. The processing stops when either (a) the number of locations associated with the website reaches the predefined limit, L, or (b) the location-specific confidence score for a respective location falls below the confidence threshold value. In the later case, all the remaining location-specific scores will also have location-specific confidence scores that fall below the confidence threshold value, and therefore do not need to be processed.

Alternatively, method 700 determines (736) zero or more locations (e.g., one or more locations, or two or more locations) associated with the website s, using the location-specific scores and the site confidence score for website s, by first determining if the site confidence score is above a predefined site confidence threshold value. If so, then the locations, if any, that have location-specific scores above a location score threshold are determined to be associated with the website s.

As described in more detail below, the location information generated by method 700 can be used as follows. A search engine system, when responding to a received search query from a client (e.g., a client device or client system distinct from the search engine system) processes the search query produce a set of search results, at least one of which comprises a search result link to a document hosted at the website. The search engine returns to the client at least a subset of the set of search results and also returns information identifying or corresponding to a location that was determined by method 700 to be associated with the website. In some embodiments, returning information identifying or corresponding to the determined location includes one or more of the following: providing text that identifies the location; providing search results relevant to the determined location (e.g., search results produced for a search query that includes the received query and one or more additional query terms identifying the determined location); and providing a map or a link to a map that shows the determined location.

FIGS. 8A and 8B provide a flowchart of an exemplary method 800, performed by a query location module 322 (FIG. 3) in a location inference engine 126 (FIGS. 1&3), to assign one or more locations to a query. Method 800 builds on the work of method 700, using the information about locations associated with websites as determined in the method 700 to determine locations associated with queries.

By inferring a location for a query, method 800 effectively treats the query as if the end user had typed in the appropriate location term(s) as part of the search query.

Method 800 executes (802) at a server system with one or more processors and memory. The server system includes one or more server computers, which may allocate the computations to multiple servers in various ways. In some embodiments, there is a list of queries to process, and the individual servers select one or more queries to process, which may occur iteratively. In other embodiments, the set of all queries to process is partitioned, and each server computer is allocated one or more partitions to process. The memory in each server computer stores (804) one or more programs for execution by the processors at that computer.

Method 800 identifies (806) a query to process. In some embodiments, the identified query is selected from a historical set of queries. In other embodiments, the identified query is received (808) from a client (e.g., a client 104, FIG. 1). In the former case, the method 800 predetermines locations associated with queries (i.e., determines the locations associated with historical queries); the predetermined locations will be used later when a user issues a search query that is identical to, or substantially the same as, the currently identified query. In the latter case, the identified query is dynamically received (808) from an end user (e.g., from a client 104 used by a user 102, FIG. 1), and therefore the calculations performed in the method 800 are used immediately in the results returned to the user.

In some embodiments, the method 800 converts (810) the identified query to a canonical form. The use of a canonical form reduces the number of queries that need to be considered because many distinct search queries will convert to the same canonical form. The reduction to a canonical form occurs in multiple ways. In some embodiments, the canonical form eliminates words like "a" and "the," which add no value to the search query. In some embodiments, the canonical form eliminates simple or common typographical errors, such as misspellings. In some embodiments, the canonical form imposes a unique word order. For example, there are one hundred twenty (five factorial, 5!=120) distinct ways to reorder five search terms. If a canonical form selects one of these, then the other 119 orders are collapsed into the single designated canonical order. In some embodiments, certain groups of words are naturally grouped together to form a composite search term, such as "San Francisco." One of ordinary skill in the art would recognize that other techniques may be applied to convert search queries to well-defined canonical forms. The process of reducing a search query to a canonical form is sometimes called normalization. Converting queries to a canonical form is one way to recognize queries that are substantially the same.

The method 800 selects (812) a set of documents that are responsive to the identified query (i.e., documents in the result set(s) produced by a search engine, or set of search engines, in response to the query). When the identified query is selected from a historical set of queries, the responsive set of documents may be large in order to maximize accuracy of the location inferences. However, when the identified query is received from an end user 102, the set of responsive documents is typically limited to the top N responsive documents, where N is a positive integer (e.g., 10, 20, 100, or any suitable number, typically in the range of 10 to 500). This limits the amount of processing required to determine a location for the query before returning search results to the user.

The method assigns (814) a weight to each document in the set of documents (i.e., the set of documents responsive to the identified query, identified in operation 812). The assignment is based, at least in part, on historical data of user clicks on search result links in search results produced for historical queries that are substantially the same as the identified query. Using the expression click(Q) to denote the number of clicks on search result links from the result set for query Q, and click(d, Q) to denote the number of clicks on links to document d in the result set for query Q, some embodiments compute the document weights as $$\text{weight}(d, Q) = \frac{\text{click}(d, Q)}{\text{click}(Q)}.$$

That is, the weight for each document d is the number of clicks on that document divided by the total number of clicks for query Q. In these embodiments, the weight for each document d may be called a click fraction with respect to the query. With this assignment of weights, $$\sum_{d \in rs(Q)} \text{weight}(d, Q) = 1$$

because each of the clicks for query Q must be on one of the search result links in the result set.

The method 800 identifies (816) a website corresponding to each of the documents in the set of documents (identified in operation 812). Multiple websites are thus identified. The expression site(d) denotes the website where document d is hosted. Because a document is identified by a URL or other unique network address, there is a single site that hosts each document. If two documents with identical content are hosted at different websites, then the two copies are distinct documents because they have different network addresses (e.g., URL's).

For each website s in a plurality of the identified websites (818), method 800 retrieves (820) scores for locations associated with the website. In some embodiments, the retrieved scores are the location-specific score, lss(s,l), for location l and website s, as described above (see description of operation 732 and equation 4, above). Each location-specific score indicates (or, more generally, corresponds to) the likelihood that the associated location l corresponds to the website s (e.g., that the associated location or an entity located at the associated location is described or discussed in one or more documents hosted by the website). In some embodiments, the information retrieved for each website s of the plurality of identified websites includes (822) a website confidence value for the website. In some embodiments, the retrieved website confidence value is the value of site_conf(s), as described above (see description of operation 734 and equation 5, above). The website confidence value indicates a likelihood that a physical location (or at least one physical location) corresponds to the website. In some embodiments, the website location-specific scores and confidence values are computed as indicated above with respect to method 700.

For each respective location of a plurality of locations associated with the identified websites (824), method 800 aggregates (826) the location-specific scores retrieved in operation 820 for the selected set of documents in the result set of the identified query Q, as weighted by the document weights assigned in operation 814 and scaled by the website confidence scores. The aggregation operation computes an aggregated likelihood that the respective location l is associated with the query Q. In some embodiments, the aggregated likelihood, also referred to as a location-specific query score, query_score(Q,l), is computed as:

$$\text{query\_score}(Q, l) = \sum_{d \in rs(Q)} \text{weight}(d, Q) \cdot \text{site\_conf}(\text{site}(d)) \cdot lss(\text{site}(d), l) \quad (6)$$

where site(d) is the website that hosts document d, lss(site(d),l) is the retrieved location-specific score for the website that hosts document d, site_conf(site(d)) is the site confidence score for that website.

Conceptually, each query score, query_score(Q,l), is computed based on the documents d responsive to the query Q. Each document is weighted based on the percentage of clicks on search result links to that document, within the search results for the query. Each site score indicates the probability that a certain location is associated with the website that is hosting the document. The aggregation thus estimates the probability that location l is associated with query Q.

A similar aggregation may be performed on the site confidence values for the websites that host the selected documents d responsive to the query Q. In some embodiments, method 800 aggregates (828) the website confidence values, site_conf(site(d)), as weighed by the document weights, to compute an aggregated confidence value for the query. The aggregated confidence values, sometimes referred to as a query confidence value, corresponds to a level of confidence that some location (i.e., at least one location) is associated with the query. In some embodiments, the query confidence value is computed as:

$$\text{query\_confidence}(Q) = \sum_{d \in rs(Q)} \text{weight}(d, Q) \cdot \text{site\_conf}(\text{site}(d)). \quad (7)$$

The method 800 assigns (830) a specific location to the query when certain predefined criteria are satisfied. The predefined criteria include (830) a requirement that the aggregated likelihood for the specific location, as provided by the query score of equation (6), exceeds a first threshold value. In some embodiments, the first threshold value is a first predefined value, such as 0.5. In other embodiments, the first threshold value is smaller (such as 0.35), but there is an additional requirement that the selected specific location have higher likelihood than the other potential locations. In some embodiments, the predefined criteria include (832) both the requirement that the aggregated likelihood for the specific location exceeds a first threshold value and a requirement that the aggregated confidence value for the query, as provided by the query confidence value of equation (7), exceeds a second threshold value. In some embodiments, the second threshold value is a second predefined value, such as 0.1. In some embodiments, the second predefined value is smaller, such as 0.05, particularly when the search history database 118 has a large amount of data. In some embodiments, the first and second threshold values are empirically determined based on analysis a training set of queries or other set of queries evaluated both by humans and using the methods described above.

In some embodiments, in which the identified query was received from a client device or system (808), method 800 returns (834) to the client at least a subset of the documents responsive to the received query and information identifying or corresponding to the specific location, if any, assigned to the query. In some embodiments, the method 800 stores (836) the identified query and the corresponding assigned specific location in a repository for subsequent retrieval. For example, the query is stored in search history database 118 and the location is stored in location database 128 (FIG. 1) (e.g., in query location information 132). In some embodiments, returning information identifying or corresponding to the determined location (834) includes one or more of the following: providing text that identifies the location; providing search results relevant to the determined location (e.g., search results produced for a search query that includes the received query and one or more additional query terms identifying the determined location); and providing a map or a link to a map that shows the determined location.

In some embodiments, method 800 receives (838) a subsequent new query from a client. In some of these embodiments, the method converts (840) the new query to a canonical form. The conversion to a canonical form is described above with respect to converting the identified query in operation 810. Method 800 matches (842) the new query to a previously identified query. When the method 800 matches the new query to a previously identified query to which a location has been assigned (see operation 830, described above), the method returns (844) to the client a set of search results that includes information identifying or corresponding to the specific location assigned to the identified query. That is, having previously assigned the location to a query, the same work need not be repeated when the same (or substantially the same) query appears again. In some embodiments, returning information identifying or corresponding to the determined location (844) includes one or more of the following: providing text that identifies the location; providing search results relevant to the determined location (e.g., search results produced for a search query that includes the received query and one or more additional query terms identifying the determined location); and providing a map or a link to a map that shows the determined location.

While the methods 700 and 800 include a number of operations that appear to occur in a specific order, it should be apparent that the methods 700 and 800 can include more or fewer operations, which can be executed serially or in parallel. An order of two or more operations may be changed and two or more operations may be combined into a single operation.

With reference to operations 718, 720 and 722 of FIG. 7A, FIGS. 9A and 9B illustrate a process of counting clicks on search results. In FIG. 9A, a user 102 (FIG. 1) has entered the search query 902 "universal studios orlando". In response to the query, the search engine 110 (FIG. 1) has returned a result set 904 comprising search result links 906-1, 906-2, 906-3, and 906-4. The user 102 evaluates the result set 904 and clicks on search result link 906-2, which causes web page 910 to be downloaded from website 908 and displayed on the user's browser 106. In addition to bringing up the web page 910 for display on the user's browser 106, the click data is transmitted (922) to the search history database 118 (FIG. 1), for inclusion in the click information 124. For FIG. 9A, the click on search result link 906-2 would count as a site click for website 908, a location-referencing click for website 908 (because of the explicit reference to a location, Orlando), and a location-specific click for the locations "Orlando," "Florida," and "United States." The location-specific clicks for Florida and the United States are implicit because of the explicit reference to Orlando.

In FIG. 9B, a user types in the query "universal studios" without any explicit reference to a location. The responsive result set 914 is similar to the result set 904 in FIG. 9A, with search result links 906-1 and 906-2 as before, but has different search result links 916-3 and 916-4 as well. As before, a click on search result link 906-2 causes web page 910 to be downloaded from website 908 and displayed on the user's browser 106. In addition to bringing up the web page 910 for display on the user's browser 106, the click data is transmitted (922) to the search history database 118, for inclusion in the click information 124. As in FIG. 9A, the user click is a site click for website 908. However, because there is no explicit reference to a location, the click is not a location-referencing click. Also, because there are no locations in the query itself, there are no location-specific clicks for any location.

Even though the users in FIGS. 9A and 9B both clicked on the same search result link 906-2 to bring up the same web page 910 from website 908, the user in the first case has provided useful information for determining locations associated with website 908 and query 902. If enough users provide the same information, it is likely that the aggregated consensus is correct.

For users who live in different countries or speak different languages, the assignment of locations to websites and queries may by different. For example, there are Disneyland parks in the United States, Japan, and France, so a user in Japan who queries for "Disneyland" without specifying a location is probably looking for Tokyo Disneyland. To accommodate these language and country differences, some embodiments track search history data by locale, which includes a (language, country) pair. The search history data is partitioned into distinct locales, and the methods described previously apply to the query history, query results history, and click data collected for each locale.

Techniques applied here to determine locations associated with a website can also be applied to an individual document. For example, consider the portion of FIG. 5 consisting of document 504-2, result sets 508-1, 508-2, and 508-4, search result links 506-2, 506-4, and 506-7, queries 510-1, 510-2, and 510-4, as well as locations 512-1, 512-2, and 512-3. The same counting of clicks described above with reference to FIGS. 7A and 7B with respect to a website s can be applied to compute a score for each location and a confidence value that document 504-2 is associated with a location. Another way to view this embodiment is to define a "website" consisting of a single specified document, and then compute the scores and confidence value(s) for this limited website.

The foregoing description, for purpose of explanation, has been described with reference to specific embodiments. However, the illustrative discussions above are not intended to be exhaustive or to limit the inventions to the precise forms disclosed. Many modifications and variations are possible in view of the above teachings. The embodiments were chosen and described in order to best explain the principles of the inventions and their practical applications, to thereby enable others skilled in the art to best utilize the inventions and various embodiments with various modifications as are suited to the particular use contemplated.

What is claimed is:

1. A computer-implemented method, comprising:
    receiving, by a computing system comprising one or more computing devices, a search query;
    identifying, by the computing system, a set of documents that are responsive to the search query;
    assigning, by the computing system, a respective weight to each respective document of the set of documents based, at least in part, on historical data, wherein the historical data is indicative of a number of user clicks on one or more search result links corresponding to one or more historical documents produced for historical queries that are substantially the same as the search query;
    identifying, by the computing system, a plurality of websites comprising a respective website for each respective document of the set of documents;
    identifying, by the computing system, one or more location scores associated with each respective document of the set of documents based on each respective website of the plurality of websites, wherein each respective location score of the one or more location scores is indicative of a likelihood that a respective geographic location is associated with the respective document, wherein the one or more location scores comprise one or more location specific scores for each respective website of the plurality of websites, wherein each respective location specific score of the one or more location specific scores corresponds to a respective geographic location, wherein the respective location specific score is predetermined based, at least in part, on a site click count indicative of a number of user clicks on one or more respective search results of the one or more search results produced for historical queries that are substantially the same as the search query, wherein the one or more respective search results are associated with one or more documents hosted at the respective web site;
    determining, by the computing system, a query score for each respective document of the set of documents based, at least in part, on the respective weight and the one or more location scores associated with the respective document;
    determining, by the computing system, a geographic location associated with the search query based, at least in part, on the query score for each respective document of the set of documents; and
    providing for display, by the computing system, a subset of the set of documents and information associated with the geographic location.

2. The computer-implemented method of claim 1, wherein each respective document of the set of documents is associated with one or more respective historical search result links.

3. The computer-implemented method of claim 2, wherein assigning, by the computing system, the respective weight to each respective document of the set of documents comprises:
    determining, by the computing system, a number of respective user clicks associated with the respective document of the set of respective documents based, at least in part, on a number of user clicks on the one or more respective historical search results;
    determining, by the computing system, a total number of user clicks for the set of documents based, at least in part, on the number of respective user clicks associated with each respective document of the set of respective documents; and
    assigning, by the computing system, the respective weight to each respective document of the set of documents based on a comparison of the number of respective user clicks and the total number of user clicks.

4. The computer-implemented method of claim 3, wherein the respective weight for each respective document of the set of documents is the number of respective user clicks associated with the respective document divided by the total number of user clicks for the set of documents.

5. The computer-implemented method of claim 1,
wherein the respective location specific score is predetermined based, at least in part, on a location-referencing click count indicative of a number of user clicks on the one or more respective search results of the one or more search results produced for historical queries that are substantially the same as the search query and that are determined to reference at least one physical locations, and
wherein the respective location specific score is predetermined based, at least in part, on a location-specific click count indicative of a number of user clicks on the one or more respective search results of the one or more search results produced for historical queries that are substantially the same as the search query and that are determined to reference a specific geographic location.

6. The computer-implemented method of claim 5, further comprising:
identifying, by the computing system, a respective site confidence value for each respective website of the plurality of websites based on the respective site click count and the respective location-referencing click count of the respective website, wherein the respective site confidence value is indicative of a likelihood that the respective website is associated with one or more physical locations; and
determining, by the computing system, the query score for each respective document of the set of documents based, at least in part, on the respective site confidence value associated with the respective website associated with the respective document.

7. The computer-implemented method of claim 6, wherein determining, by the computing system, the query score for each respective document of the set of documents comprises:
aggregating, by the computing system, the one or more respective location specific scores for the respective website associated with the respective document as weighted by the respective weight of the respective document and scaled by the respective site confidence value for the respective website associated with the respective document.

8. The computer-implemented method of claim 1, wherein determining, by the computing system, the geographic location associated with the search query based, at least in part, on the query score for each respective document of the set of documents comprises:
determining, by the computing system, that an aggregated query score for the set of documents exceeds a predetermined threshold value.

9. A system comprising:
one or more processors; and
a memory storing instructions that when executed by the one or more processors cause the system to perform operations comprising:
receiving a search query;
identifying a set of documents that are responsive to the search query;
assigning a respective weight to each respective document of the set of documents based, at least in part, on historical data, wherein the historical data is indicative of a number of user clicks on one or more search result links corresponding to one or more historical documents produced for historical queries that are substantially the same as the search query;
identifying, by the computing system, a plurality of websites comprising a respective website for each respective document of the set of documents;
identifying one or more location scores associated with each respective document of the set of documents based on each respective website of the plurality of websites, wherein each respective location score of the one or more location scores is indicative of a likelihood that a respective geographic location is associated with the respective document, wherein the one or more location scores comprise one or more location specific scores for each respective website of the plurality of websites, wherein each respective location specific score of the one or more location specific scores corresponds to a respective geographic location, wherein the respective location specific score is predetermined based, at least in part, on a site click count indicative of a number of user clicks on one or more respective search results of the one or more search results produced for historical queries that are substantially the same as the search query, wherein the one or more respective search results are associated with one or more documents hosted at the respective website;
determining a query score for each respective document of the set of documents based, at least in part, on the respective weight and the one or more location scores associated with the respective document;
determining the geographic location associated with the search query based, at least in part, on the query score for each respective document of the set of documents; and
providing for display a subset of the set of documents and information associated with the geographic location.

10. The system of claim 9, wherein each respective document of the set of documents is associated with one or more respective historical search result links.

11. The system of claim 10, wherein assigning the respective weight to each respective document of the set of documents comprises:
determining a number of respective user clicks associated with the respective document of the set of respective documents based, at least in part, on a number of user clicks on the one or more respective historical search results;
determining a total number of user clicks for the set of documents based, at least in part, on the number of respective user clicks associated with each respective document of the set of respective documents; and
assigning the respective weight to each respective document of the set of documents based on a comparison of the number of respective user clicks and the total number of user clicks.

12. The system of claim 11, wherein the respective weight for each respective document of the set of documents is the number of respective user clicks associated with the respective document divided by the total number of user clicks for the set of documents.

13. The system of claim 9, providing for display the information associated with the geographic location comprises:
providing text that identifies the geographic location;
providing a map that shows the geographic location; or providing a link to a map that shows the geographic location.

14. The system of claim 9, further comprising:
storing the search query and information associated with the geographic location in the memory.

15. One or more non-transitory computer-readable media comprising instructions that when executed by one or more computers cause the one or more computers to perform operations comprising:
receiving a search query;
identifying a set of documents that are responsive to the search query;
assigning a respective weight to each respective document of the set of documents based, at least in part, on historical data, wherein the historical data is indicative of a number of user clicks on one or more search result links corresponding to one or more historical documents produced for historical queries that are substantially the same as the search query;
identifying, by the computing system, a plurality of websites comprising a respective website for each respective document of the set of documents;
identifying one or more location scores associated with each respective document of the set of documents based on each respective website of the plurality of websites, wherein each respective location score of the one or more location scores is indicative of a likelihood that a respective geographic location is associated with the respective document, wherein the one or more location scores comprise one or more location specific scores for each respective website of the plurality of websites, wherein each respective location specific score of the one or more location specific scores corresponds to a respective geographic location, wherein the respective location specific score is predetermined based, at least in part, on a site click count indicative of a number of user clicks on one or more respective search results of the one or more search results produced for historical queries that are substantially the same as the search query, wherein the one or more respective search results are associated with one or more documents hosted at the respective website;
determining a query score for each respective document of the set of documents based, at least in part, on the respective weight and the one or more location scores associated with the respective document;
determining a geographic location associated with the search query based, at least in part, on the query score for each respective document of the set of documents; and
providing for display a subset of the set of documents and information associated with the geographic location.

16. The one or more non-transitory computer-readable media of claim 15, wherein each respective document of the set of documents is associated with one or more respective historical search result links.

17. The one or more non-transitory computer-readable media of claim 16, wherein assigning the respective weight to each respective document of the set of documents comprises:
determining a number of respective user clicks associated with the respective document of the set of respective documents based, at least in part, on a number of user clicks on the one or more respective historical search results;
determining a total number of user clicks for the set of documents based, at least in part, on the number of respective user clicks associated with each respective document of the set of respective documents; and
assigning the respective weight to each respective document of the set of documents based on a comparison of the number of respective user clicks and the total number of user clicks.

18. The one or more non-transitory computer-readable media of claim 17, wherein the respective weight for each respective document of the set of documents is the number of respective user clicks associated with the respective document divided by the total number of user clicks for the set of documents.

19. The one or more non-transitory computer-readable media of claim 15, providing for display the information associated with the geographic location comprises:
providing text that identifies the geographic location;
providing a map that shows the geographic location; or
providing a link to a map that shows the geographic location.

* * * * *